(12) United States Patent
Klein et al.

(10) Patent No.: US 7,323,155 B2
(45) Date of Patent: Jan. 29, 2008

(54) METHOD FOR PRODUCING SILANES

(75) Inventors: Stephan Klein, Mettmann (DE);
Hans-Dieter Block, Leverkusen (DE);
Hans-Joachim Leimkühler,
Leverkusen (DE); Werner Dick,
Bergisch Gladbach (DE); Dirk Müller,
Bergisch Gladbach (DE);
Johannes-Peter Schäfer, Kürten (DE)

(73) Assignee: Solarworld Aktiengesellschaft, Bonn (DE)

( * ) Notice: Subject to any disclaimer, the term of this patent is extended or adjusted under 35 U.S.C. 154(b) by 944 days.

(21) Appl. No.: 10/432,129

(22) PCT Filed: Nov. 9, 2001

(86) PCT No.: PCT/EP01/12970

§ 371 (c)(1),
(2), (4) Date: May 20, 2003

(87) PCT Pub. No.: WO02/42206

PCT Pub. Date: May 30, 2002

(65) Prior Publication Data

US 2004/0030171 A1 Feb. 12, 2004

(30) Foreign Application Priority Data

Nov. 21, 2000 (DE) ................. 100 57 519

(51) Int. Cl.
*C01B 33/08* (2006.01)
(52) U.S. Cl. ...................................... 423/342
(58) Field of Classification Search ............... 423/342, 423/341, 343; 502/29, 31, 33, 56, 514
See application file for complete search history.

(56) References Cited

U.S. PATENT DOCUMENTS 4,701,430 A * 10/1987 Jung et al. ................. 502/62
4,725,420 A * 2/1988 Tachikawa et al. ......... 423/347

\* cited by examiner

*Primary Examiner*—Edward M. Johnson
(74) *Attorney, Agent, or Firm*—McGlew & Tuttle, P.C.

(57) ABSTRACT

The invention relates to a method of producing silane or hydrochlorosilanes by disproportionation of a higher chlorinated hydrochlorosilane or a mixture of said hydrochlorosilanes in the presence of a catalyst. Before the catalyst is used, it is a) washed with hyper-pure water in one or several steps; b) transferred in the water-moist state to the reactor in which the disproportionation is to proceed; c) treated in the reactor with boiling methanol or rinsed with anhydrous methanol; and d) the methanol is removed from the catalyst by evacuation and/or stripping with inert gas. The invention further relates to a method for treating disproportionation catalysts.

10 Claims, No Drawings

METHOD FOR PRODUCING SILANES

The present invention relates to a method for producing silane or hydrochlorosilanes by disproportionation of higher chlorinated hydrochlorosilanes or hydrochlorosilane mixtures in the presence of a pretreated catalyst, as well as a method for treating the catalyst.

$SiH_4$ is an excellently suitable starting material, from which by thermal decomposition, if necessary after further purification, very pure silicon in semiconductor quality can be deposited. The need for hyper-pure silicon is strongly increasing and thus also the need for pure silane the excellent suitability of which for the manufacture of hyper-pure silicon is more and more recognized and used.

The manufacture of silane from trichlorosilane by disproportionation is particularly advantageous in economic terms.

The manufacture of dichlorosilane and silane from hydrochlorosilanes by disproportionation is carried out essentially in accordance with the gross equations $$SiHCl_3 \rightarrow SiCl_4 + SiH_2Cl_2 \tag{1a}$$

$$2SiH_2Cl_2 \rightarrow SiCl_4 + SiH_4 \tag{1b}$$

$$4SiHCl_3 \rightarrow 3SiCl_4 + SiH_4 \tag{2}$$

In order to allow the rapid manufacture of silane in this manner also at low temperatures and without a formation of decomposition products, the presence of catalysts is helpful. Basic catalysts are particularly proven, among them amines and amine derivatives, e.g. amine salts, acid amides, nitrites, nitrogen-containing heterocyclic compounds and other nitrogen-containing substances, must be emphasized.

So it is known that amines, particularly tertiary amines and their hydrochlorides and quaternary ammonium chlorides, both in liquid (DE 3 500 318 A1) as well as in solid form, e.g. bound to solid carriers (DE 3 311 650 C2), accelerate as catalysts the disproportionation of the trichlorosilane in an economically advantageous manner. Amines bound to solid carriers are employed preferably because this way the catalyst can be separated easily and it can be avoided that polluting amines are carried in during the reacting gaseous-liquid silane-chlorosilane phase.

For this reason and the facilitation of the procedure related to it, only solid, formed amines, either fixed to carriers or in network polymers, are used as catalysts in technical practice.

As a rule, the disproportionation of trichlorosilane is carried out in several steps, for example in two steps. It was already described, however, to carry out the disproportionation in one step according to the principle of reactive distillation. The reactive distillation is characterized by combining reaction and distillative separation in one apparatus, particularly a column. Due to the continuous distillative removal of the easiest boiling constituent in each space element an optimum gradient is always maintained between the balance and the actual content of easier boiling constituents and/or easiest boiling constituent, resulting in a maximum reaction velocity (DE 198 60 146 A1).

The advantages of the reactive rectification can be exploited particularly by combining it with the catalysis on solids. This is achieved in that the disproportionation of trichlorosilane to silicon tetrachloride and silane is carried out in a column, the fillings of which (tower packing, built-ins, etc.) which enable the exchange of materials, are linked with the catalytically active solids.

Because of the fixation of the solid catalyst in the reaction apparatus it is essential to employ it in hyper-pure form and particularly free from water. The high purity is a precondition for preventing the product from being polluted by the catalyst, the absence of water reduces the problem of hydrolysis of the chlorosilanes on the catalyst and the problems related to the hydrolysis products HCl (corrosion, neutralisation of aminic catalyst functions) and silicic acid and/or substances similar to silicic acid (deposits on the catalyst).

Hydrochlorosilanes are decomposed by water forming oligomeric siloxanes, trichlorosilane for example according to $$HSiCl_3 + 1.5H_2O \rightarrow 1/n(HSiO_{1.5})n + 3HCl \tag{3}$$

In a dry mass of 4000 kg of catalyst for example, this corresponds to the quantities of water and hydrolysis products specified in the table below, depending on the moisture contents of the catalyst:

| Moisture [%] | m (H₂O) [kg] | m (HSiO$_{1.5}$) [kg] | m (HCl) [kg] | Standard liter HCL |
|---|---|---|---|---|
| 0.05 | 2 | 4 | 8 | 179 |
| 0.1 | 4 | 8 | 16 | 359 |
| 0.3 | 12 | 24 | 48 | 1067 |
| 1 | 40 | 79 | 160 | 3586 |
| 2 | 80 | 157 | 320 | 7172 |
| 2.5 | 100 | 196 | 400 | 8966 |

It is therefore highly required to minimize the hydrolysis of hydrochlorosilanes by the water residues on the catalyst.

The purification and pretreatment of the catalyst for the disproportionation of the hydrochlorosilanes has been paid little attention by now, so that the potential of catalytical activity could not been used to the full extent.

In fact, EP 206 621 A1 describes the drying of the catalyst by an intermittent displacement of water by ethanol and toluol, with the catalyst being suspended in the dried solvents and subsequently separated from the solvent by decantation. The remaining moisture contents are given with <0.5%. However, neither the removal of impurities nor the question of how to integrate this procedure into the technical catalysis process and the transfer of the catalyst into the reactor is considered.

In the JPL study "Development of a polysilicon process based on chemical vapor deposition, Final report (1979–1982); Hemlock Semiconductor Corporation" (DOE/JPL 955533-83, p. 26), the single methods displacement by solvents, vacuum drying, drying in the oven, drying in the desiccator and rinsing with inert-gas are mentioned, however not further specified, as pretreatment variants for the drying of catalyst for the disproportionation. Despite desiccator drying all methods were suitable for pretreatment, however neither the removal of water-soluble impurities and the effective remaining moisture contents, nor the adaptation of the conditioning to the application of the catalyst in the reactor is paid any attention.

In *Ind. Eng. Chent. Res.* 1988, 27, 1600–1606, thermal drying of catalyst for disproportionation at 80° C. in vacuum conditions is described as an efficient drying method, however without quantifying the remaining moisture contents or considering the problem impurities.

It is common for all these procedures, that in the end the pretreated catalyst needs to be transferred to the reaction place, i.e. into the reactor where the disproportionation will be carried out. During this transfer, however, the catalyst again absorbs moisture and air particles, thus being contaminated anew. In addition to this, it turned out difficult, or even impossible, to transfer a dry catalyst in the usual commercial spherical form into the containers (pockets, gussets, tubes of the above mentioned fillings, tower packings, built-ins, etc.) where it is supposed to be filled in, in order to enable it being fixed in the reactor (preferably in a reactive rectification column). The reason for this is that the dry spherically formed catalyst particles build up an electrostatic charge when being poured in, and fly apart due to their light weight, thus making it impossible to fill them into the intended spaces.

Therefore the task was to provide a method that allows a pretreatment of solid catalysts for disproportionation of hydrochlorosilanes prior to their first contact with hydrochlorosilanes such that the moisture contents and the contents of organic compounds, particularly those that are reactive towards hydrochlorosilanes, and the contents of compounds that are soluble in hydrochlorosilanes, is minimized, whereby the molecular and macroscopic structure and solidity of the catalyst are maintained.

Subject-matter of the invention is therefore a method for the manufacture of compounds according to the formula

$$(H)_xSi(Cl)_y \qquad (I),$$

wherein
x is 2, 3 or 4, and
y is 0, 1 or 2, and
x+y=4, by disproportionation of a hydrochlorosilane of the formula

$$(H)_aSi(Cl)_b \qquad (II),$$

wherein
a is 1, 2 or 3, and
b is 1, 2 or 3, and
a+b=4 and
b>y, or a mixture of such hydrochlorosilane in the presence of a catalyst, characterized in that the catalyst prior to use
 a) is washed with hyper-pure water in one or several steps,
 b) is transferred in a water-moist state into the reactor where the disproportionation shall be carried out, and
 c) is either treated with boiling methanol or rinsed with anhydrous methanol in the reactor, and
 d) the methanol is removed from the catalyst by evacuation and/or by stripping with inert gas.

So, according to the invention, hydrochlorosilanes with a lower number of chlorine substituents or silane starting from higher chlorinated hydrochlorosilanes is obtained, whereby due to the nature of the disproportionation reaction also a higher-chlorinated coupled/coupling product occurs, which can be defined as educt, however, that reacts to the desired products in this sense.

The method according to the invention can be carried out discontinuously or continuously. A continuous reaction process is preferred.

The method according to the invention is particularly useful for the manufacture of silane by disproportionation of trichlorosilane, dichlorosilane, or a mixture thereof, preferably trichlorosilane.

It is also possible, for example, to obtain dichlorosilane by disproportionation of trichlorosilane.

Trichlorosilane and dichlorosilane can be employed in this as pure substances or mixtures with each other or also as mixtures with silicon tetrachloride and/or monochlorosilane.

Preferably the disproportionation method according to the invention is carried out according to the principle of reactive distillation.

Suitable catalytically active solids are known and specified, for example, in DE-OS-2 507 864. Such suitable solids, for example, are solids carrying amino groups or alkyleneamino groups on a structure of polystyrene, cross-linked with divinylbenzole. Examples of amino groups or alkylenamino groups are for instance: Dimethylamino, diethylamino, ethyhnethylamino, di-n-propylamino, di-iso-propylamino, di-2-chlorethylanino, di-2-chlorpropylamino groups and the respectively substituted alkyleneamino groups and the respective hydrochlorides, or the trialkylammonium groups formed from them by methylation, ethylation, propylation, butylation, hydroxyethylation or benzylation with chloride as counterion. Of course, in the case of quaternary ammonia salts or protonized ammonia salts also catalytically active solids with other anions, e.g. hydroxide, sulphate, bi-sulphate, bicarbonate etc. can be introduced into the method according to the invention, a transformation into the chloride form, however, is inevitable under the reaction conditions in the course of time, this applies also to organic hydroxy groups. Therefore, ammonia salts containing chloride as counterion are preferred.

Also those solids are suitable as catalytically active solids which consist of a structure of polyacrylic acid, particularly a polyacrylamide structure, that has bound, for example, trialkylbenzylammonium via an alkyl group.

Another group of catalytically active solids suitable for the method according to the invention are for example, solids carrying sulphonate groups on a structure of polystyrene, cross-linked with divinylbenzole, which are opposed by tertiary or quaternary ammonium groups as cations.

As a rule, macroporous or mesoporous ion exchangers are more suitable than gel resins. Further suitable catalytically active solids are, for example, solids carrying organic amino groups of the above type, e.g. solids with a 3-dimethylaminopropyl-siloxy group, on a solid inorganic structure like silicic acid or zeolite (U.S. Pat. No. 4,701,430). Suitable catalytically active solids are usually employed in form of powdered or spherical contacts.

The preferred resins chosen are polystyrene resins, that are cross-linked with divinylbenzole, with tertiary amine groups in the side chain, either in form of gel, or more preferred as macroporous resins, because this catalyst type fulfils excellently the requirement of thermal and chemical stability and high activity.

A number of suitable catalytically active solids is commercially available.

According to the invention the catalyst is first washed with hyper-pure water (step a)).

Preferably washing is carried out at temperatures from 60 to 90° C.

By washing the catalyst with hyper-pure water water-soluble impurities are removed. Washing can be carried out in one or several steps, with a total contact period of water and catalyst between 0.5 and 50 hours, preferably between 1 and 24 hours.

The ratio of volumes of water to catalyst in each washing step is preferably 1:1 to 10:1.

Washing, for example, can be carried out in a way that the catalyst is suspended in the washing water or that the washing water runs in a free or forced flow through the catalyst.

If the catalyst is suspended in the washing water, the adherent water can be separated mechanically at the end of the washing, for example by decanting, filtering or centrifuging.

If washing is carried out in several steps, an inorganic alkaline solution, e.g. soda lye, potash lye or ammonium hydroxide solution, can be added to the washing water in the first washing step. For example, the concentration of the alkaline lye in the water can be 0.1 to 20 weight percent.

According to the invention, after washing the water-moist catalyst is transferred into the reactor where the disproportionation reaction shall be carried out (step b)).

The catalyst can be easily handled in this form and shows only a low sensitivity towards the influence of the air.

Step b), for example, can comprise several sub-steps, during which the water-moist catalyst is first filled into containers with a volume of approx. 1–50 ml, e.g. pockets, gussets or tubes in the fillings, tower packings, built-ins, preferably made of a metallic material, which are suitable for a good gas-liquid exchange. As a rule, these containers containing the disproportionation catalyst are sealed in the next sub-step, e.g. by welding, soldering, mechanical pressing, and are afterwards assembled to elements to be inserted into the reactor, i.e. preferably the reactive rectification column. It is also possible to join the fillings or built-ins containing the catalyst in the column to form elements or packages.

In the following step c), the catalyst contained in the reactor is rinsed with anhydrous methanol and/or treated with boiling methanol.

The ratio of volumes of methanol to catalyst while the catalyst in the reactor is treated with methanol is preferably 0.1:1 to 1:0.3.

Preferably the methanol treatment is carried out twice with freshly introduced methanol, particularly preferred 2 to 5 times.

Preferably such treatment of the catalyst in the reactor is carried out with boiling methanol by heating the methanol at the lower-most end of the reactor until it boils, and allowing it to condense at the upper end of the reactor. After the treatment the methanol is removed from the lower part of the reactor. The methanol removes soluble impurities.

If the treatment is carried out with boiling methanol, preferably a pressure of 1–3 bar is adjusted during the treatment in the reactor. Due to the adjusted pressure the temperature of the boiling methanol is adjusted to approx. 64° to approx. 90° C. Between the individual steps of the methanol treatment preferably inert gas or hydrogen is introduced into the reactor, which will displaced again from the reactor in the next step of the treatment.

Each of the steps of the treatment with boiling methanol lasts, for example, 0.5 to 50 hours, preferably 1–24 hours.

It is preferred to remove a small portion, e.g. 1–10% of the employed material, at the upper end of the reactor in each round together with the air that is displaced from the reactor or the displaced inert gas or low boiling substances driven out of the catalyst.

Less preferably, but also possible, step c) can be combined with washing the catalyst with ethanol propanol and/or isopropanol.

After the catalyst was treated with methanol, this is followed according to the invention by the removal of the methanol from the catalyst by evacuating it and/or stripping with inert gas (step d)).

Preferably the methanol is allowed to drop off thoroughly prior to evacuation and/or stripping with inert gas, so that only the residual methanol remaining in the catalyst and the fillings and built-ins and in the reactor needs to be removed.

The methanol is preferably removed at temperatures from 60 to 90° C.

Inert gases in meaning applicable here are, for example, nitrogen, noble gases and hydrogen. The use of hydrogen for stripping as well as for pressure compensation after the evacuating steps is preferred in this. The inert gas is preferably heated to the desired temperature of 60–90° C. prior to its entry into the reactor. The flow of the inert gas through the reactor can be from the top to the bottom and from the bottom to the top.

The evacuation is reasonably carried out at changing pressures, ideally immediately after the last methanol treatment step when the reactor is still heated up. As the reactor together with the introduced catalyst cools down in changing-pressure mode, it is useful in case of several evacuation steps, to heat up the reactor from time to time to approx. 64 to 90° C. by introducing heated inert gas.

It is possible, but not required, after the treatment with methanol (step c)) or after the removal of the methanol from the catalyst (step d)), to subject the catalyst to a chemical drying procedure. This can be achieved, for example, by adding thionylchloride or phosgen to the catalyst that was pre-treated in the reactor according to the invention. The residual water reacts with these chemicals without forming solid oxygenic products, actually volatile oxides $CO_2$ and $SO_2$ are formed, thus minimizing the risk of obstruction of pores during the subsequent contact with chlorosilanes.

However, if these water-destroying chemicals are used, the resulting gaseous reaction products $CO_2$ and/or $SO_2$ and the unreacted reactants must again be removed subsequently by evacuation and/or by stripping with inert gas.

Subject-matter of the invention is furthermore a method for the treatment of a catalyst for disproportionation of hydrochlorosilanes, characterized in that the catalyst a) is washed with hyper-pure water in one or several steps,
b) is transferred in a water-moist state into the reactor where the disproportionation shall he carried out, and
c) is either treated with boiling methanol or rinsed with methanol in the reactor, and
d) the methanol is removed from the catalyst by evacuation and/or by stripping with inert gas.

The advantageous and preferred embodiments of this method are in accordance with what was specified above.

The method according to the invention can be applied, for example, in processes for the manufacture of dichlorosilane and silane and as a sub-step in processes for the manufacture of hyper-pure silicon from silane.

Preferably the method according to the invention is integrated into a general method for producing silane and/or hyper-pure silicon.

It is particularly preferred that the method according to the invention be integrated into a method for producing silane and/or hyper-pure silicon comprising the following steps:

1. Trichlorosilane synthesis on the basis of silicon, silicon tetrachloride, hydrogen and, if necessary, another chloride source in a fluidized bed reactor under pressure and subsequent isolation of the produced trichlorosilane by distillation and recycling of the unreacted silicon tetrachloride, and, if desired, the unreacted hydrogen.
2. Disproportionation of trichlorosilane to silane and silicon tetrachloride through the intermediate stages of dichlorosilane and monochlorosilane according to the method according to the invention on alkaline catalysts, preferably catalysts containing amino groups, carried out in two apparatuses or in one, and recycling of the produced silicon provided as a high-boiling component into the first reaction area.
3. Further use of the silane of the purity given after the preceding step, or purifying the silane until the purity required for the intended purpose is achieved, preferably by distillation, particularly preferred by distillation under pressure.
and, if necessary,
4. Thermal decomposition of silane to obtain high-purity silicon, usually above 500° C.

Apart from thermal decomposition on electrically heated high-purity silicon rods, another suitable method is the thermal decomposition in a fluidized bed consisting of hyper-pure silicon particles, particularly when the production of solar-grade high-purity silicon is desired. To this aim, silane can be mixed with hydrogen and/or inert gases at a mol ratio of 1:0 to 1:10.

The invention will be further explained by the following examples, which are provided as illustrations of the invention—but not limiting it to them.

EXAMPLES

Example 1

Comparative Experiment Thermal Drying (Static)

An ion exchanger LEWATIT® MP 62 (BAYER AG) was suspended five times in hot distilled water of approx. 90° C. (ratio of volumes of catalyst:water approx. 1:1), each time for a period of 0.5 h, and the water was removed each time by decantation. The catalyst was then dried at 60° C. in a glass bowl in a drying oven. After 12 h the remaining moisture contents amounted to 3 weight percent according to the Karl Fischer titration.

Example 2

Comparative Experiment Thermal Drying in the Inert Gas Flow

An ion exchanger LEWATIT® MP 62 (BAYER AG) was suspended five times in hot distilled water of approx. 90° C. (ratio of volumes of catalyst:water approx. 1:1), each time for a period of 0.5 h, and the water was removed each time by decantation. The catalyst was then treated at 70° C. in a reaction pipe in a flow of nitrogen. After 12 h the remaining moisture contents amounted to 0.15 weight percent according to the Karl Fischer titration.

Example 3

Comparative Experiment Thermal Drying in a Vacuum

An ion exchanger LEWATIT® MP 62 (BAYER AG) was suspended five times in hot distilled water of approx. 90° C. (ratio of volumes of catalyst:water approx. 1:1), each time for a period of 0.5 h, and the water was removed each time by decantation. The catalyst was then treated at 70° C. and 30 hPa in a reaction pipe in a vacuum. After 12 h the remaining moisture contents amounted to 0.2 weight percent according to the Karl Fischer titration.

Example 4

An ion exchanger LEWATIT® MP 62 (BAYER AG) was suspended five times in hot distilled water of approx. 90° C. (ratio of volumes of catalyst:water approx. 1:1), each time for a period of 0.5 h, and the water was removed each time by decantation. This catalyst was transferred into a reaction pipe with a frit bottom, a supply valve and a discharge valve, in which it was mixed with anhydrous methanol so that is was completely covered with it. After 5 minutes the discharge valve was opened and the solvent allowed to drain off, then the valve was closed again and the process repeated. Altogether the reaction pipe was refilled with fresh solvent five times. The catalyst was then treated at 70° C. and 30 hPa in the reaction pipe in a vacuum. After 12 h the remaining moisture contents amounted to 0.18 weight percent according to the Karl Fischer titration.

Example 5

An ion exchanger LEWATIT® MP 62 (BAYER AG) was suspended five times with hot distilled water of approx. 90° C. (ratio of volumes of catalyst:water approx. 1:1), each time for a period of 0.5 h, and the water was removed each time by decantation. This catalyst was transferred into a reaction pipe with a frit bottom a supply valve and a discharge valve, in which it was mixed with anhydrous methanol so that is was completely covered with it. After 5 minutes the discharge valve was opened and the solvent allowed to drain off, then the valve was closed again and the process repeated. Altogether the reaction pipe was relined with fresh solvent five times. After the last methanol treatment the catalyst was mixed for 0.5 h with a solution of 3 weight percent thionylchloride in n-heptane. The catalyst was then treated at 70° C. and 30 hPa in the reaction pipe in a vacuum. After 12 h the remaining moisture contents amounted to 0.06 weight percent according to the Karl Fischer titration.

Example 6

An ion exchanger LEWATIT® MP 62 (BAYER AG) was suspended five times with hot distilled water of approx. 90° C. (ratio of volumes of catalyst:water approx. 1:1), each time for a period of 0.5 h, and the water was removed each time by decantation. This catalyst was transferred into a reaction pipe with a frit bottom, a supply valve and a discharge valve, in which it was mixed with anhydrous methanol so that is was completely covered with it. After 5 minutes the discharge valve was opened and the solvent allowed to drain off, then the valve was closed again and the process repeated. Altogether the reaction pipe was refilled with fresh solvent five times. Afterwards the same procedure was repeated by five treatments with anhydrous n-heptane. The catalyst was then treated at 70° C. and 30 hPa in the reaction pipe in a vacuum. After 12 h the remaining moisture contents amounted to 0.20 weight percent according to the Karl Fischer titration. The example shows that the reduction of the remaining moisture contents in example 5 is to be attributed to the additional chemical drying by means of thionylchloride and not to the added n-heptane.

Example 7

The catalysts of Examples 2 (comparison) and 4 (according to the invention) were compared with each other with respect to contained thermally desorptable compounds. To this end, catalysts which were pretreated according to Examples 2 and/or 4, were tempered for 1 h at 90° C. and the desorpted compounds frozen out at a low temperature. The frozen-out samples were evaluated quantitatively (weighing, ppm based on the amount of catalyst used) and qualitatively (GC-MS). The catalyst of Example 4 that was pretreated according to the invention showed a lower contents in the waste-gas with respect to the substance classes amines, glycol, hydrocarbon (HC) and other trace elements than the catalyst of Example 2 (see also the table below).

|  | Catalyst Example 2 | Catalyst Example 4 |
|---|---|---|
| Methanol [ppm] | 0 | 4 |
| Amines [ppm] | 4 | 1 |
| Glycol [ppm] | 12 | 0 |
| HC (C10–C16) [ppm] | 163 | 127 |
| others [ppm] | 4 | 0 |
| Total [ppm] | 183 | 132 |

The invention claimed is:

1. A method for the manufacture of compounds according to the formula

$(H)_x Si(cl)_y$ (I), wherein
x is 2, 3 or 4, and
y is 0, 1 or 2, and
x+y=4,
by disproportionation of at least one of a hydrochlorosilane of the formula

$(H)_a Si(Cl)_b$ (II), wherein
a is 1, 2 or 3, and
b is 1, 2 or 3, and
a+b=4 and
b>y,
and a mixture of such hydrochlorosilanes in the presence of a catalyst, wherein the catalyst prior to use a) is washed with hyper-pure water in one or several steps,
b) is transferred in a water-moist state into the reactor where the disproportionation shall be carded out, and
c) is at least one of treated with boiling methanol and rinsed with methanol in the reactor, and
d) the methanol is removed from the catalyst by evacuation and/or by shipping with inert gas.

2. A method according to claim 1, wherein the compound in formula I is silane and the hydrochlorosilane in formula II is at least one of trichlorosilane, dichlorosilane and a mixture thereof.

3. A method according to claim 1, wherein the compound in formula I is dichlorosilane and the hydrochlorosilane in formula II is trichlorosilane.

4. A method according to claim 1, wherein the disproportionation is carried out according to the principle of reactive distillation.

5. A method according to claim 1, wherein the washing of the catalyst is carried out with hyper-pure water (step a) at temperatures from 60 to 90° C.

6. A method according to claim 1, wherein the treatment of the catalyst in the reactor is carried out with methanol (step c) by heating the methanol at the lower-most end of the reactor until it boils, and allowing it to condense at the upper end of the reactor.

7. A method according to claim 1, wherein the treatment of the catalyst with methanol (step c) is carried out by rinsing with anhydrous methanol.

8. A method according to claim 1, wherein the treatment of the catalyst with methanol in the reactor (step c) is carried out at least two times with freshly introduced methanol.

9. A method according to claim 1, wherein the ratio of volumes of methanol to catalyst during the treatment of the catalyst in the reactor with methanol (step c) is 0.1:1 to 1:0.3.

10. A method according to claim 1, wherein after the removal of the methanol from the catalyst (step d), the catalyst is subjected to a chemical post-drying procedure.

* * * * *